(12) United States Patent
Brewer et al.

(10) Patent No.: US 9,158,336 B2
(45) Date of Patent: Oct. 13, 2015

(54) CASES FOR TABLET COMPUTERS AND METHODS

(75) Inventors: Wesley G. Brewer, Menlo Park, CA (US); John Geldman, Los Gatos, CA (US); Francisco Pardorla, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 971 days.

(21) Appl. No.: 13/102,621

(22) Filed: May 6, 2011

(65) Prior Publication Data

US 2012/0281356 A1    Nov. 8, 2012

(51) Int. Cl.
| | |
|---|---|
| G06F 1/16 | (2006.01) |
| A45C 11/00 | (2006.01) |
| F16M 13/00 | (2006.01) |
| F16M 11/10 | (2006.01) |
| A45C 13/02 | (2006.01) |

(52) U.S. Cl.
CPC .............. *G06F 1/1628* (2013.01); *A45C 11/00* (2013.01); *F16M 11/10* (2013.01); *F16M 11/105* (2013.01); *F16M 13/00* (2013.01); *A45C 2011/003* (2013.01); *A45C 2013/025* (2013.01); *A45C 2200/15* (2013.01)

(58) Field of Classification Search
CPC ......... H04M 1/21; H04M 1/00; G05F 1/1628; A45C 11/00; A45C 2011/003; A45C 2013/025; A45C 2200/15; F16M 11/00; F16M 11/105
USPC ................ 361/679.55, 679, 55; 710/301, 315
See application file for complete search history.

(56) References Cited

U.S. PATENT DOCUMENTS

| | | | | |
|---|---|---|---|---|
| 5,132,895 A | * | 7/1992 | Kase | 363/60 |
| 7,149,082 B1 | | 12/2006 | Baiko et al. | |
| 7,525,291 B1 | * | 4/2009 | Ferguson | 320/164 |
| D619,356 S | | 7/2010 | Hillman | |
| 8,616,508 B1 | * | 12/2013 | Coleman | 248/176.1 |
| 2005/0057225 A1 | * | 3/2005 | Marquet | 320/138 |
| 2006/0007751 A1 | * | 1/2006 | Tanaka | 365/185.29 |
| 2006/0139002 A1 | * | 6/2006 | Zemke et al. | 320/128 |
| 2007/0088967 A1 | * | 4/2007 | Fu et al. | 713/340 |
| 2008/0183909 A1 | * | 7/2008 | Lim et al. | 710/14 |
| 2009/0069050 A1 | * | 3/2009 | Jain et al. | 455/558 |

(Continued)

FOREIGN PATENT DOCUMENTS

| | | |
|---|---|---|
| CN | 200951668 | 9/2007 |
| KR | 200426273 | 9/2006 |

(Continued)

OTHER PUBLICATIONS

"Review: Targus 360 Rotating Stand & Case for iPad 2," Mar. 16, 2011, http://www.ilounge.com/index.php/reviews/entry/targus-360-rotating-stand-case-for-ipad-2/.*

(Continued)

*Primary Examiner* — Farley Abad
(74) *Attorney, Agent, or Firm* — Dicke, Billig & Czaja, PLlC

(57) ABSTRACT

Cases for tablet computers and methods are disclosed. An embodiment of one such case has an interface configured to allow the tablet computer to communicate with a removable storage device using a communication protocol not supported by the tablet computer, where the case is configured to contain at least a portion of the tablet computer therein.

45 Claims, 11 Drawing Sheets

(56) References Cited

U.S. PATENT DOCUMENTS

| | | |
|---|---|---|
| 2010/0038269 A1 | 2/2010 | Picard |
| 2010/0064153 A1* | 3/2010 | Gk et al. ............... 713/310 |
| 2010/0078343 A1* | 4/2010 | Hoellwarth et al. ......... 206/320 |
| 2010/0116702 A1 | 5/2010 | Schentrup et al. |
| 2010/0164836 A1* | 7/2010 | Liberatore ............ 345/1.1 |
| 2011/0015496 A1* | 1/2011 | Sherman et al. ............ 600/301 |
| 2011/0043162 A1* | 2/2011 | Lee et al. ............ 320/107 |
| 2011/0045876 A1 | 2/2011 | Ko |
| 2011/0215217 A1* | 9/2011 | De La Garza ............ 248/397 |

FOREIGN PATENT DOCUMENTS

| | | |
|---|---|---|
| KR | 20070021374 | 2/2007 |
| KR | 20090068836 | 6/2009 |

OTHER PUBLICATIONS

Third Rail Mobility, LLC, "The Third Rail System User Manual," Copyright 2011, (11 pgs.), http://www.thirdrailmobility.com/download/documents/ThirdRail_Manual.pdf.

Jamie Pert, "iPad 2 Accessories—Compact Flash (CF) Card Reader with USB", http://www.product-reviews.net/2011/03/29/ipad-2-accessories-compact-flash-cf-card-reader-with-usb/, Mar. 29, 2011, pp. 2.

Charles Starrett, "Zoomit Brings SD Card Access to iPhone, iPod Touch", http://www.ilounge.com/index.php/news/comments/zoomit-brings-sd-card-access-to-iphone-ipod-touch/, Feb. 8, 2010, pp. 1.

* cited by examiner

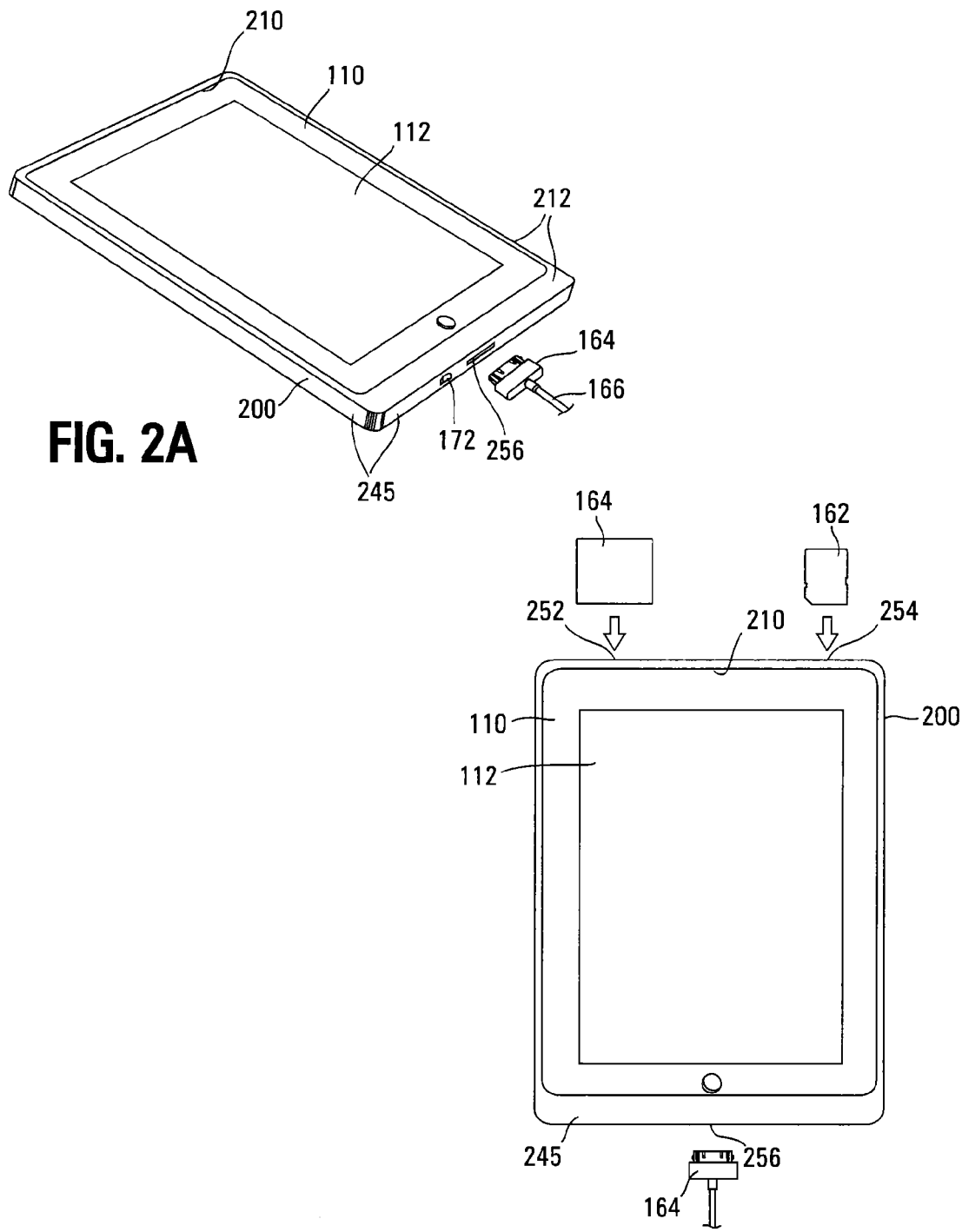

(C) (A) (B) (D)

CASES FOR TABLET COMPUTERS AND METHODS

FIELD

The present disclosure relates generally to tablet computers, and, in particular, in one or more embodiments, the present disclosure relates to cases for tablet computers and methods.

BACKGROUND

Tablet computers are typically portable computers that usually use a touchscreen as an input device. For example, some tablet computers may use a virtual keyboard, e.g., displayed on the touchscreen, for text input through the touchscreen. Some tablet computers may use handwriting recognition, e.g., responsive to marks made on the touchscreen with a stylus, as an additional means for text input through the touchscreen. Examples of tablet computers include the APPLE® iPad®, BLACKBERRY® Playbook, HP (Hewlett Packard) TouchPad™, ANDROID® tablets (e.g., Motorola Xoom ANDROID® Tablet), etc. Some tablet computers are not compatible with, e.g., cannot communicate with, certain removable storage devices, e.g., non-volatile memory cards, such as SD Secure Digital® (SD) memory cards, CompactFlash® (CF) mass storage memory cards, etc.

Although adapters exist for adapting the iPad® to communicate with SD and CF memory cards, SD and CF memory cards can cause excessive drain on the battery of the iPad®. In addition, existing SD and CF adaptors are inconvenient, difficult to use, and detract from the overall appearance of the iPad®.

For the reasons stated above, and for other reasons stated below which will become apparent to those skilled in the art upon reading and understanding the present specification, there is a need in the art for alternatives to existing adapters for adapting tablet computers to communicate with removable storage devices, such as SD and CF memory cards.

BRIEF DESCRIPTION OF THE DRAWINGS

FIG. 2A is a front isometric view of a tablet computer in a case, according to an embodiment.

FIG. 2B is a front view of the tablet computer of FIG. 2A in the case of FIG. 2A.

DETAILED DESCRIPTION

Figure 1A:
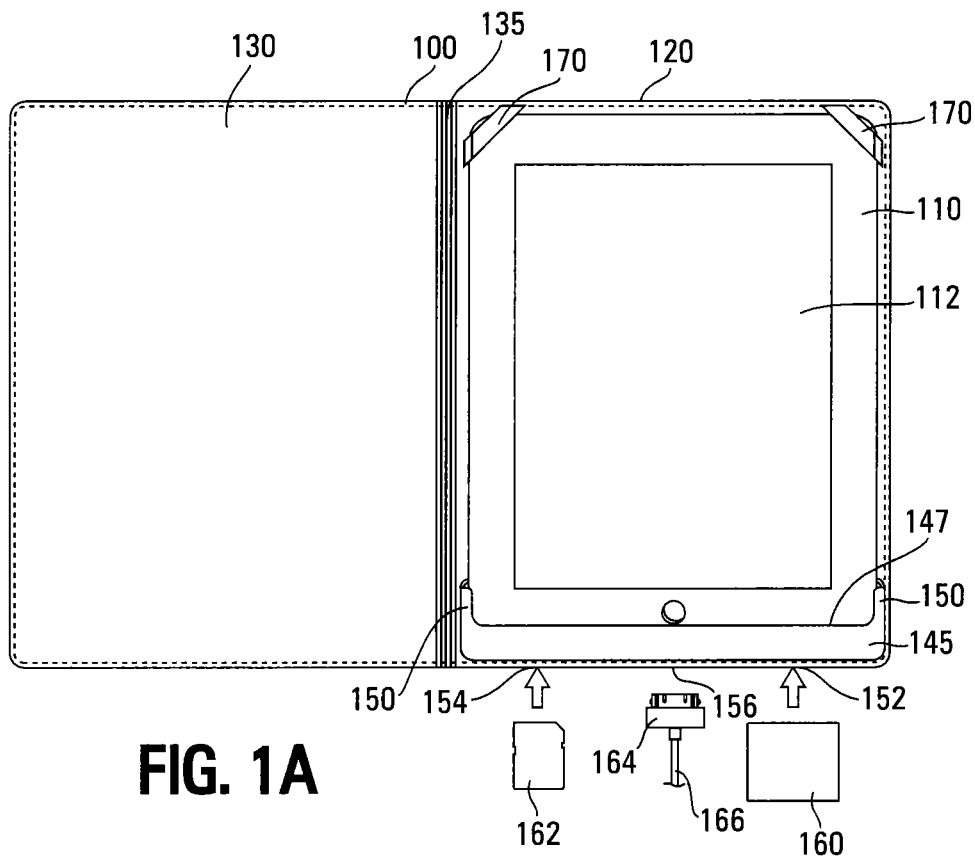
FIG. 1A is a front view of a tablet computer in a case, according to an embodiment.

In the following detailed description, reference is made to the accompanying drawings that form a part hereof, and in which is shown, by way of illustration, specific embodiments. In the drawings, like numerals describe substantially similar components throughout the several views. Other embodiments may be utilized and structural, logical, mechanical, and electrical changes may be made without departing from the scope of the present disclosure. The following detailed description is, therefore, not to be taken in a limiting sense.

Figure 1B:
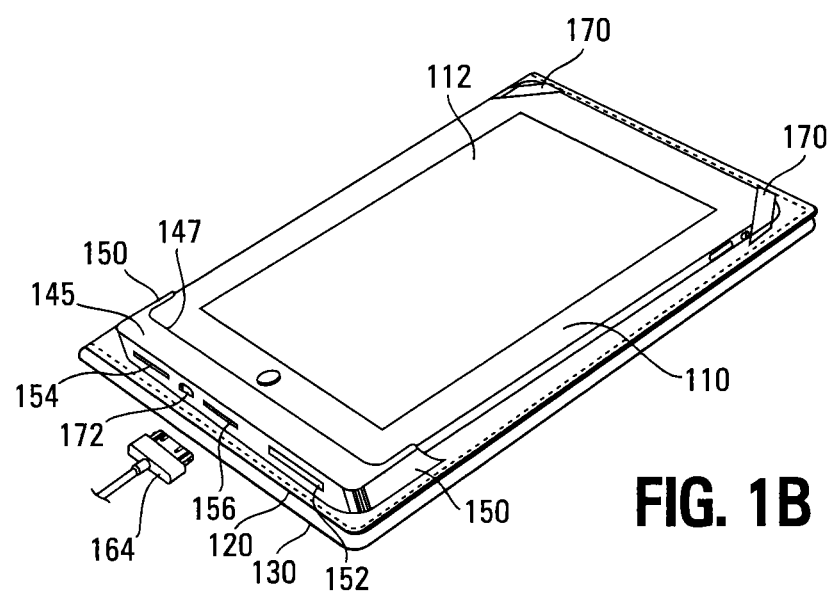
FIG. 1B is an isometric view of the tablet computer of FIG. 1A in the case of FIG. 1A.

FIG. 1A illustrates a case 100 for a tablet computer 110, such as an APPLE® iPad®, BLACKBERRY® Playbook, HP (Hewlett Packard) TouchPad™, ANDROID® tablets (e.g., Motorola Xoom ANDROID® Tablet), etc. For example, case 100 may be a folder. Case 100 may be configured to contain at least a portion of tablet computer 110 therein. Case 100 may include a base 120 and a cover 130 pivotally attached to base 120, e.g., by a flexible connector 135 that allows base 120 and cover 130 to pivot relative to each other. FIG. 1B is an isometric view of case in an open state with cover 130 pivoted (e.g., folded) behind base 120.

Cover 130 may pivot relative to base 120 to alternately cover and expose tablet computer 110, e.g., the touchscreen 112 of tablet computer 110. For example, cover 130 may cover tablet computer 110 when case 100 is in a closed state, and cover 130 is removed from over tablet computer 110 when case 100 is in an open state, as shown in FIGS. 1A and 1B. That is, cover 130 may be pivoted to alternately place case 100 in closed and open states.

Figure 1C:
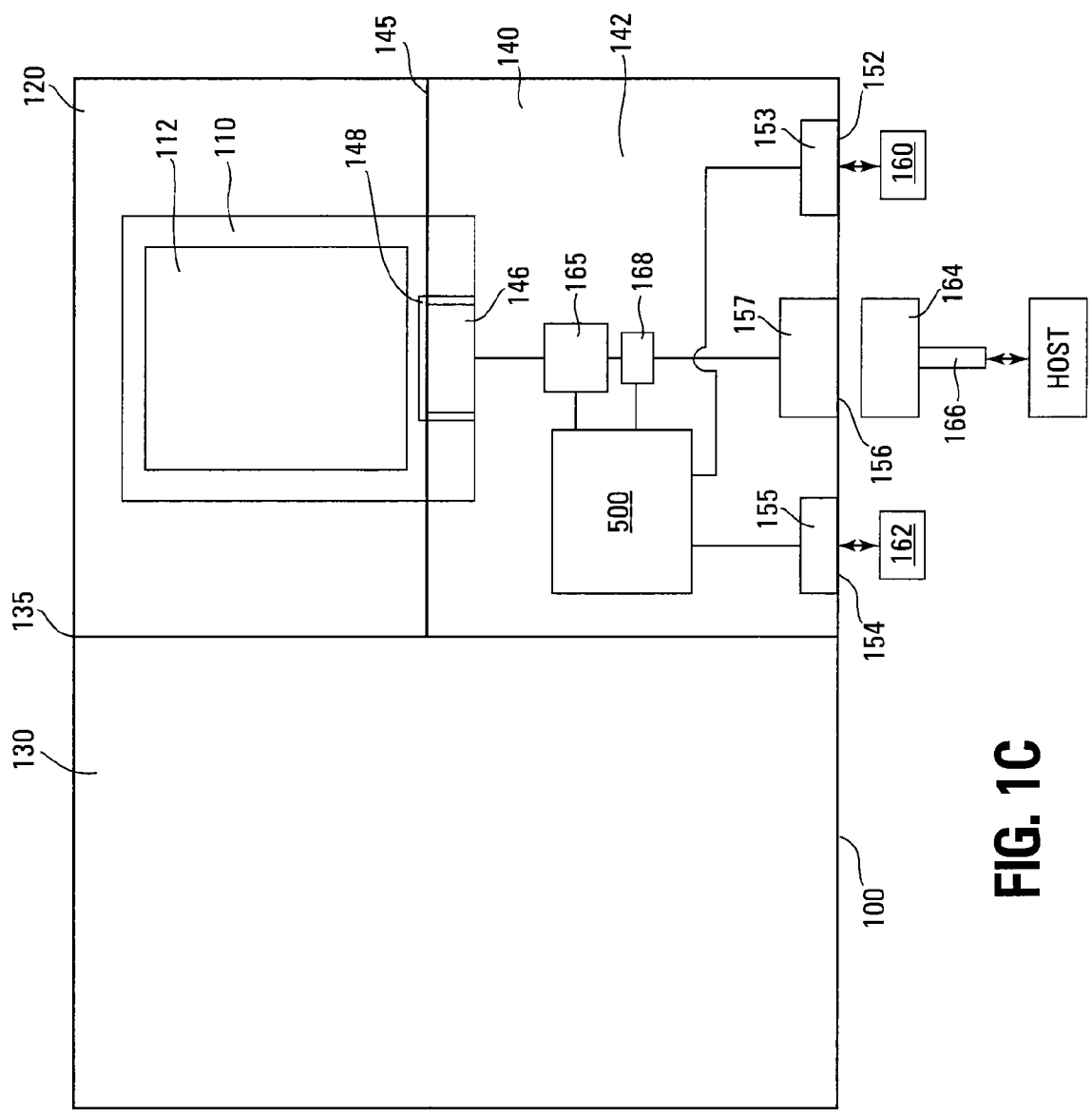
FIG. 1C is a block diagram of the case of FIG. 1A, according to another embodiment.

Base 120 may include, in one embodiment, an interface (e.g., a reader) 140 on base 120, as shown in the block diagram of FIG. 1C. Interface 140 may be on a printed circuit board 142, for example. Interface 140 may be contained in a housing (e.g., a sleeve) 145 that is on base 120. Interface 140 may be configured to communicatively couple and physically connect to tablet computer 110. Although many of the embodiments discussed herein are shown to include various physical, electrical connections, other embodiments could also utilize one or more couplings other than physical, electrical connections (e.g., wireless couplings, optical couplings, magnetic couplings, and the like). Interface 140 may include a connector 146 (e.g., a male connector) configured to removably connect to a mating connector 148 (e.g., a female connector) of tablet computer 110, as shown in FIG. 1C. An end of tablet computer 110 may be received in an opening 147 of housing 145, for example, so that computer 110 is communicatively coupled and physically connected to interface 140 by connector 146. For some embodiments, connector 146 may be a universal serial bus (USB) connector.

A portion of housing 145 may wrap around the sides of tablet computer 110. For example, extensions 150 of housing 145 may extend over portions of the sides of tablet computer 110 so that housing 145 forms a portion of a frame that encloses a portion of tablet computer 110, as shown in FIGS. 1A and 1B. Therefore, so the portion of tablet computer 110 may be contained between and covered by extensions 150.

One or more openings may be in an outer edge of housing 145, e.g., opposite opening 147. For example, an opening (slot) 152 may be in housing 145 for receiving a removable storage device (e.g., a removable memory card) 160, such as a memory card with a 16-bit data transfer bus, e.g., a CF memory card, and an opening (slot) 154 may be in housing 145 for receiving a removable storage device (e.g., a removable memory card) 162, such as a memory card with a 4-bit data transfer bus, e.g., an SD memory card. For some embodiments, an opening (slot) 156 may be in housing 145 for receiving a connector 164 that may be connected to a cable 166 that may be coupled to a host, such as a personal computer. For other embodiments, opening 156 may be omitted. For other embodiments, additional openings may be added for different storage devices, such as universal serial bus (USB) storage devices, such as a USB drives, that use the USB protocol.

Removable storage devices 160 and 162 may be non-volatile memory cards. Removable storage devices 160 and 162 may have different form factors, different power requirements, different physical interfaces, and different communication protocols. For example, removable storage device 160 may communicate over a parallel interface, whereas removable storage device 162 may communicate over a serial interface. Commands, such as read and write commands, for removable storage device 160 may be formatted differently than commands for removable storage device 162. For other embodiments, a storage device 160 and/or a storage device 162 may be a USB drive.

For some embodiments, tablet computer 110 may have a different communications interface than storage devices 160 and 162, such as a USB interface, and may use a communication protocol, e.g., a USB communication protocol, that is different than those of storage devices 160 and 162. As such, the communication protocol of tablet computer 110 may not be supported by storage device 160 and/or storage device 162, and the communication protocol of storage device 160 and/or storage device 162 may not be supported by tablet computer 110. For example, commands, such as read and write commands, may be formatted differently for tablet computer 110 than for storage device 160 and/or storage device 162. Therefore, commands from computer 110 may need to be translated into formats recognized by storage device 160 and/or storage device 162.

Opening 152 may provide access to a connector 153 of interface 140 that removably connects to storage device 160, and opening 154 may provide access to a connector 155 of interface 140 that removably connects to storage device 162. Opening 156 may provide access to a connector 157 of interface 140 that may connect to connector 164.

For some embodiments (e.g., embodiments that include opening 156 and connector 164), interface 140 may include a switch 165 (e.g., a two-position, four-pole switch) that may selectively couple connector 157, and thus the host, to tablet computer 110, and that may selectively couple connector 146, and thus tablet computer 110, to an interface module 500 of interface 140. Connector 153, and thus storage device 160, and/or connector 155, and thus storage device 162, may also be coupled to interface module 500, e.g., for embodiments with or without opening 156 and connector 164. An actuator 172 (FIG. 1B), such as a slide, may be used to actuate switch 165 from a position where switch 165 couples the host to tablet computer 110 to a position where switch 165 couples tablet computer 110 to interface module 500 and vice versa.

For some embodiments, (e.g., embodiments with opening 156, connector 164, and switch 165), interface 140 may include a current sensor 168 selectively coupled to connector 146 by switch 165 and directly coupled to interface module 500. For some embodiments, interface module 500, switch 165, current sensor 168, and connectors 153, 155, and 157 may be formed on circuit board 142.

For other embodiments (e.g., embodiments without opening 156 and connector 164), switch 165 and current sensor 168 may be omitted. In these embodiments, connector 146, and thus tablet computer 110, may be coupled directly to interface module 500.

Interface 140 may be configured to allow communication between tablet computer 110 and removable storage device 160 and/or to removable storage device 162. Interface 140 may couple tablet computer 110 to removable storage device 160 and/or to removable storage device 162 so that tablet computer 110 can at least write data to and read data from removable storage device 160 and/or removable storage device 162. Interface 140 may be configured to translate commands (e.g., read/write commands), data, etc. from a format used by tablet computer 110 to a format recognized by removable storage device 160 and/or removable storage device 162. For example, interface 140 may be configured translate commands, data, etc. from formats used by APPLE® iPad®, BLACKBERRY® Playbook, HP (Hewlett Packard) TouchPad™, ANDROID® tablets, etc., to a format recognized by removable storage device 160 and/or removable storage device 162.

For some embodiments, bands 170, e.g., that may be of a resilient material, may be attached to base 120. Bands 170 may wrap around tablet computer 110 adjacent to corners of tablet computer 110, where these corners are adjacent to an end of tablet computer 110 that is opposite the end of tablet computer 110 that is received in housing 145, as shown in FIGS. 1A and 1B. For example, bands 170 may exert a force on tablet computer 110 that acts to bias tablet computer 110 against base 120. As such, bands 170, interface 140, e.g., via connector 146, and extensions 150 of housing 145 act to secure tablet computer 110 to base 120.

Figure 2C:
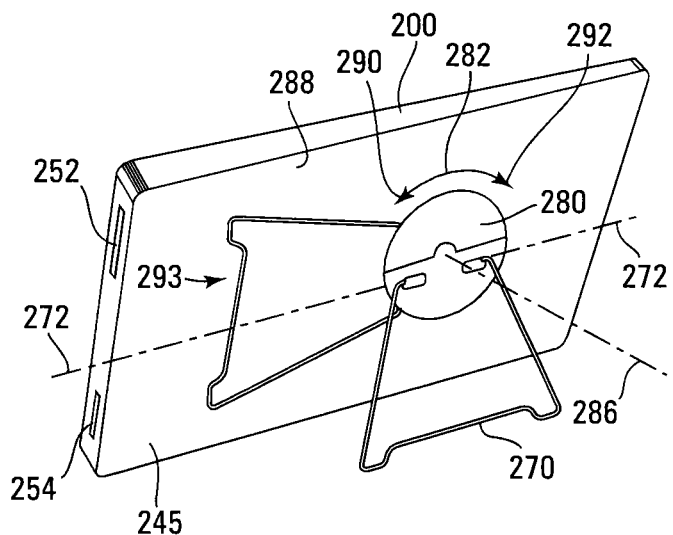
FIG. 2C is a rear isometric view of the case of FIG. 2A.
Figure 2D:
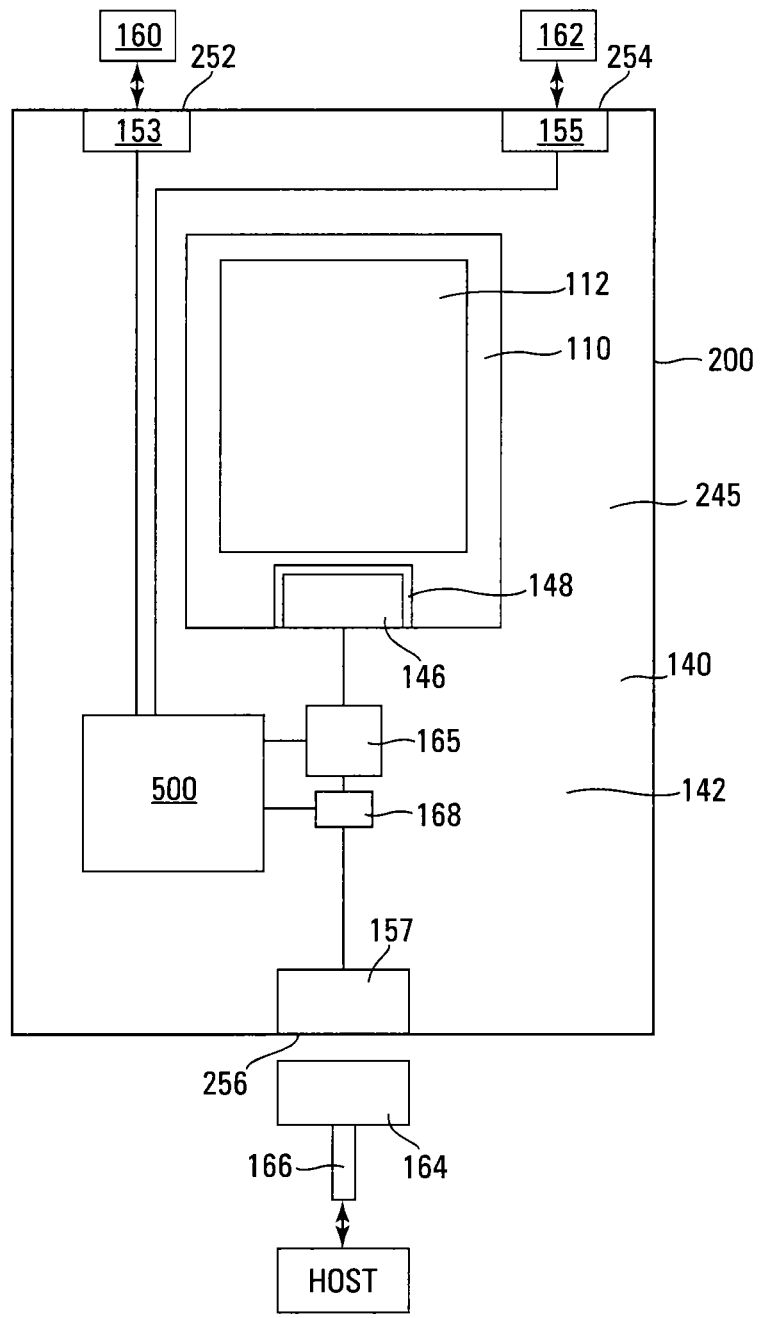
FIG. 2D is a block diagram of the case of FIG. 2A.

FIGS. 2A-2D illustrate a case (e.g., a frame) 200 for tablet computer 110, where FIG. 2D is a block diagram of case 200. Common numbering is used in FIGS. 2A-2D and FIGS. 1A-1C to denote similar (e.g., the same) elements. Case 200 may be configured to contain at least a portion of tablet computer 110 therein. Case 200 may include a blind opening (e.g., a recess 210) in a front surface 212 that is closed at its bottom for receiving tablet computer 110 therein. The depth of recess 210 may be about the thickness of tablet computer 110 so that the surface of touchscreen 112 of tablet computer 110 may be substantially flush with the front surface 212 of case 200.

When tablet computer 110 is in recess 210, at least a portion of tablet computer may be covered by case 200, while touchscreen 112 is exposed. For example, the edges, e.g., the sides and ends, and back of tablet computer 110 may be covered, while touchscreen 112 is exposed.

At least a portion of case 200 may form a housing 245 that may contain the interface 140, e.g., on circuit board 142, and the recess 210 may be formed in an exterior of housing 245. For example, interface 140 may be contained in a hollow interior of case 200. Tablet computer 110 may be coupled to interface 140, e.g., by the connector 146, when tablet computer 110 is in recess 210.

One or more openings may be in an outer edge of case 200, e.g., in housing 245. For example, an opening (slot) 256 may be in housing 245 for receiving connector 164 at one end case 200; an opening (slot) 252 may be in an housing 245 at an opposite end of case 200 for receiving removable storage device 160; an opening (slot) 254 may be in housing 245 at the same end of the case as opening (slot) 252 for receiving removable storage device 162. However, for other embodiments, opening 252 and/or opening 254 may be at the same end of case 200 as opening 256. Openings 252, 254, and 256 may respectively provide access to the connectors 153, 155, and 157, as shown in FIG. 2D. For embodiments where connector 157 may be omitted from interface 140, as described above in conjunction with FIG. 1C, opening 256 may be omitted.

A support (e.g., a stand) 270 may be pivotally and/or rotatably attached to a back surface 288 of case 200, and thus housing 245, that is opposite and substantially parallel to front surface 212 of case 200 so that support 270 can pivot relative to case 200 about axis 272, as shown in FIG. 2C. For some embodiments, support 270 may be pivotally attached to a movable (e.g., rotatable) pad, such as a disk 280, that may be rotatably attached to case 200, and thus housing 245, adjacent to back surface 288. For example, a surface of disk 280 may be substantially flush with back surface 288.

Disk 280 may rotate in the directions indicated by arrow 282 relative to case 200 and back surface 288, thereby providing an additional pivot axis for support 270. For example, disc may rotate about axis 286 that may be substantially perpendicular to axis 272. Axis 272 may be substantially parallel to back surface 288, and thus front surface 212, of case 200, and axis 286 may be substantially perpendicular to the back surface back surface 288 and thus front surface 212. For example, axes 272 and 286 may be respectively parallel and perpendicular to touchscreen 112 when tablet computer 110 is in case 200.

Figure 3:
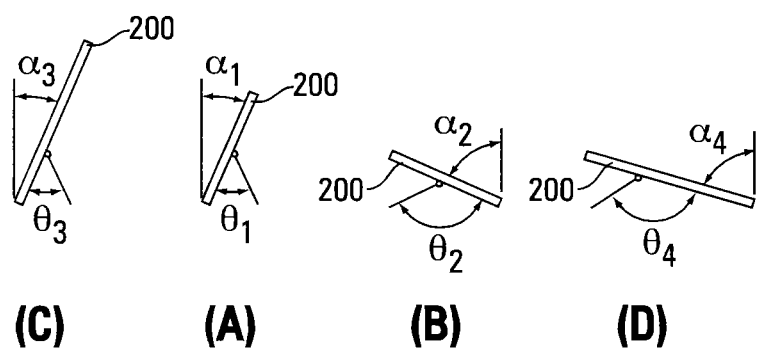
FIGS. 3(A)-3(D) are side views illustrating a case positioning a tablet computer at different positions, according to another embodiment.

FIG. 3(A) shows case 200 configured as in FIG. 2C with support 270 pivoted about axis 272 by an angle $\theta_1$ from case 200 so as to support case at an angle $\alpha_1$ from the vertical. FIG. 3(B) shows case 200 configured as in FIG. 2C with support 270 pivoted about axis 272 by an angle $\theta_2$ from case 200 so as to support case at an angle $\alpha_2$ from the vertical. FIGS. 3(C) and 3(D) show case 200 after support 270 has been pivoted about axis 286 (e.g., by rotating disc 280 about axis 286), such as in the direction of arrow head 290, e.g., by about 90 degrees, from the configuration in FIG. 2C. FIG. 3(C) further shows that stand 270 has been pivoted about axis 272 by an angle $\theta_3$ from case 200 so as to support case at an angle $\alpha_3$ from the vertical. FIG. 3(D) further shows that stand 270 has been pivoted about axis 272 by an angle $\theta_4$ from case 200 so as to support case at an angle $\alpha_4$ from the vertical. Disc 280 may be rotated in the direction of arrowhead 292 and support 270 may be pivoted about axis 272 toward case 200 to place support in the position indicated by arrow 293 when support 270 is not in use, for example.

Figure 4A:
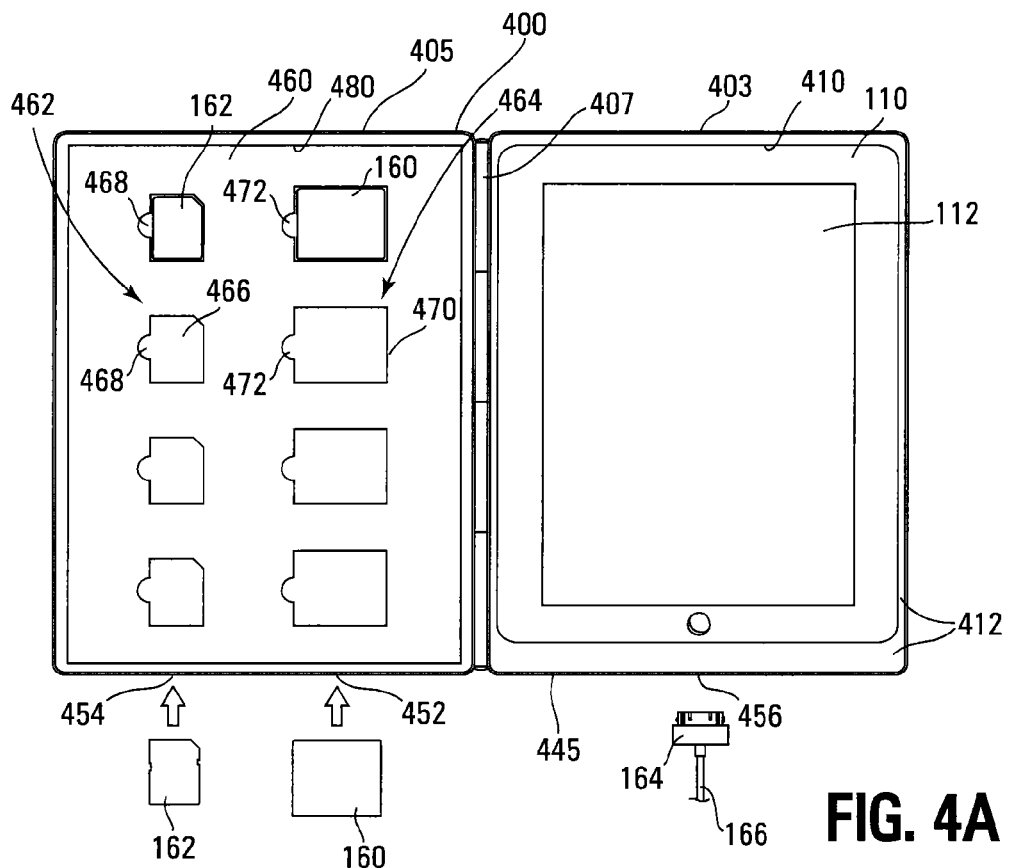
FIG. 4A is a front view of a tablet computer in a case, according to another embodiment.
Figure 4B:
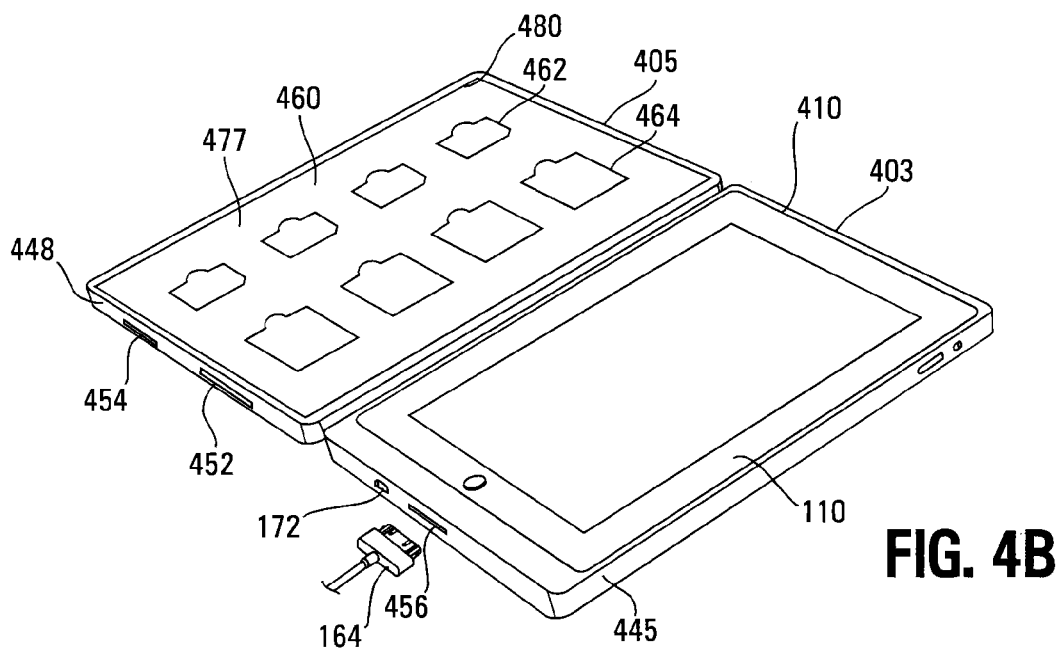
FIG. 4B is an isometric view of the tablet computer of FIG. 4A in the case of FIG. 4A.
Figure 4C:
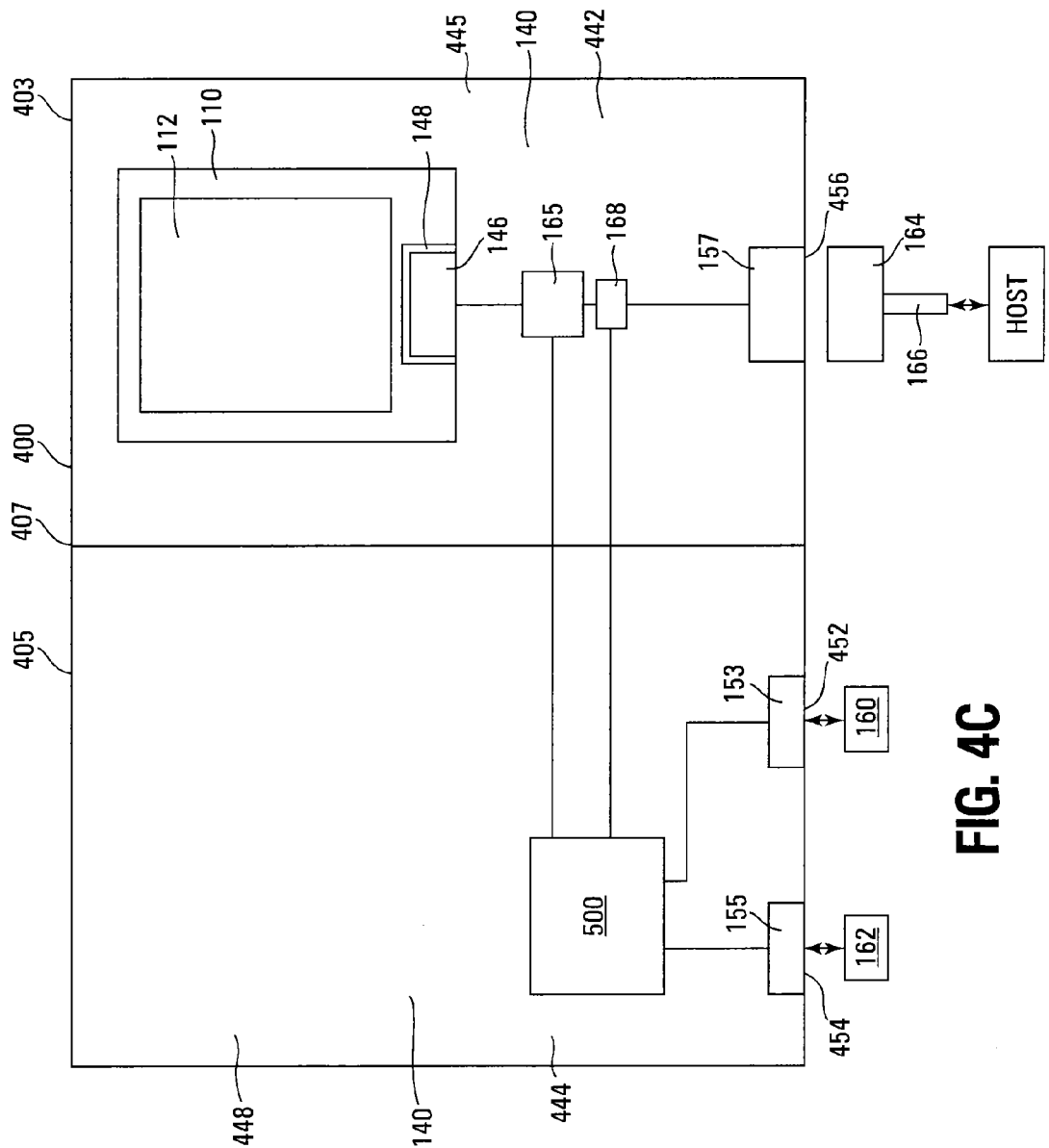
FIG. 4C is a block diagram of the case of FIG. 4A.

FIGS. 4A-4C illustrate a case 400 for tablet computer 110, where FIG. 4C is a block diagram. Common numbering is used in FIGS. 4A-4C and FIGS. 1A-1C to denote similar (e.g., the same) elements. Case 400 may be a folder and may be configured to contain at least a portion of tablet computer 110 therein.

Case 400 may include a base 403 and a cover 405 pivotally attached to base 403, e.g., by a hinge 407, that allows base 403 and cover 405 to pivot relative to each other. Cover 405 may pivot relative to base 403 to alternately cover and expose tablet computer 110, e.g., the touchscreen 112 of tablet computer 110. For example, cover 405 covers tablet computer 110 when case 400 is in a closed state, and cover 405 is removed from over tablet computer 110 when case 400 is in an open state, as shown in FIGS. 4A and 4B. That is, cover 405 may be pivoted to alternately place case 400 in closed and open states.

Base 403 may be a frame-like structure with a blind opening (e.g., a recess 410) in a front surface 412 that is closed at its bottom for receiving tablet computer 110 therein. The depth of recess 410 may be about the thickness of tablet computer 110 so that the surface of touchscreen 112 of tablet computer 110 is substantially flush with the front surface 412 of base 403.

For some embodiments, when case 400 is in its open state and tablet computer 110 is in recess 410, at least a portion of tablet computer 110 may be covered by base 400, while touchscreen 112 is exposed. For example, the edges, e.g., the sides and ends, and back of tablet computer 110 may be covered, while touchscreen 112 is exposed, as shown in FIGS. 4A and 4B.

At least a portion of base 403 may form a housing 445 that may contain a printed circuit board 442 (FIG. 4C). For some embodiments, the portion of interface 140 that includes switch 165, current sensor 168, and connectors 146 and 157 may be formed on circuit board 442, as shown in FIG. 4C. Connector 146 connects to tablet computer 110 when tablet computer 110 is in recess 410.

At least a portion of cover 405 may include a housing 448 therein that may contain a printed circuit board 444 (FIG. 4C). For some embodiments, the portion of interface 140 that includes interface module 500 and connectors 153 and 155 may be formed on circuit board 444. For other embodiments, switch 165 and/or current sensor 168 may be formed on circuit board 444 in cover 405 instead of circuit board 442 in base 403.

The portions of interface 140 respectively contained in housings 445 and 448 (e.g., in base 403 and cover 405) may be communicatively coupled by flexible links (e.g., flexible conductors, such as wiring) that pass over hinge 407 and that can flex when cover 405 and base 403 are pivoted relative to each other. For example, switch 165 and current sensor 168 may be coupled to interface module 500 by the flexible links shown in FIG. 4C. Note that for embodiments where connector 157, switch 165, and current sensor 168 may be omitted from interface 140, connector 146, and thus tablet computer 110, may be directly electrically coupled to interface module 500 by a flexible link. Note that the positions of the various connectors may be modified without departing from the scope of the disclosure.

One or more openings may be in an outer edge of housing 448 of cover 405. For example, an opening (slot) 452 may be in housing 445 for receiving removable storage device 160, and an opening (slot) 454 may be in housing 445 for receiving a removable storage device 162. Openings 452 and 454 may respectively provide access to connectors 153 and 155 of interface 140. For some embodiments, an opening (slot) 456 may be in housing 445 for providing access to connector 157. Opening 456 may be omitted for embodiments where connector 157, switch 165, and current sensor 168 may be omitted from interface 140.

One or more blind openings (e.g. recesses) that are closed at their bottoms may be in a surface 460 of cover 405 that faces and covers tablet computer 110, and thus forms an interior surface of case 400, when case 400 is closed. For example, one or more recesses 462 may be formed in surface 460, each for storing a spare storage device 162 therein, and/or one or more recesses 464 may be formed in surface 460, each for storing a spare storage device 160 therein. Further recesses may also be provided for storing other spare storage devices.

For other embodiments, inserting a storage device 162 into a respective recess 462 may communicatively couple that storage device 162 to interface module 500 and/or inserting a storage device 160 into a respective recess 464 may communicatively couple that storage device 160 to interface module 500. For example, one or more of recesses 462 may provide access to one or more connectors, such as one or more connectors 155, and/or one or more of recesses 464 may provide access to one or more connectors, such as one or more connectors 153. For example, inserting a storage device 162 in a respective recess 462 may connect that storage device 162 to a respective connector 155 and/or inserting a storage device 160 in a respective recess 460 may connect that storage device 160 to a respective connector 153.

Each recess 462 may have a portion 466 that has substantially the same shape and size as storage device 162, and a portion 468 that is contiguous to portion 466, as shown in FIG. 4A. When storage device 162 is in a recess 462, the portion 466 may be covered by storage device 162, and the portion 468 may be left open, as shown in FIG. 4A, e.g., to provide access to a user's finger to facilitate the removal of storage device 162 from the respective recess 462 and thus from cover 405.

Each recess 464 may have a portion 470 that has substantially the same shape and size as storage device 160, and a portion 472 that is contiguous to portion 470, as shown in FIG. 4A. When storage device 160 is in a recess 464, the portion 470 may be covered by storage device 160, and the portion 472 may be left open, as shown in FIG. 4A, e.g., to provide access to a user's finger to facilitate the removal of storage device 160 from the respective recess 464 and thus from cover 405.

For some embodiments, cover 405 may include a resilient material 477, such as foam, e.g., in a blind opening (e.g., a recess 480) that is closed at its bottom, so that the surface 460 is of resilient material 477. Resilient material 477 may exert a force on a storage device 162 in a respective recess 462 and/or on a storage device 160 in a respective recess 464 for retaining the storage device 160 and/or the storage device 162 in their respective recesses and thus in cover 405.

Figure 5:
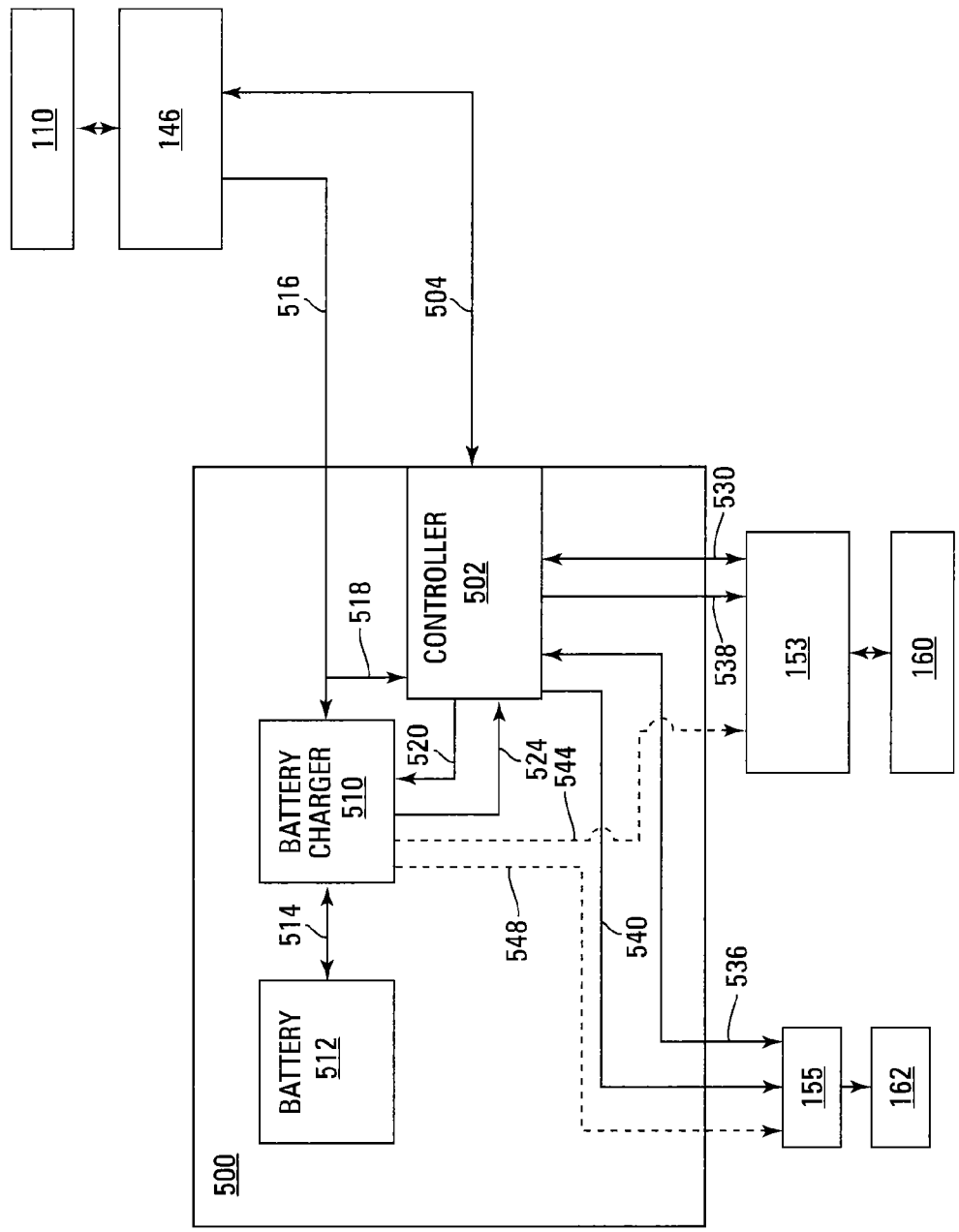
FIG. 5 is a block diagram of an interface of a case, according to another embodiment.

FIG. 5 is a block diagram of an interface, such as interface 140 for embodiments without switch 165, current sensor 168, and connector 157, as described above in conjunction with FIGS. 1C, 2D, and 4C. Common numbering is used in FIGS. 1C, 2D, and 4C and FIG. 5 to denote similar (e.g., the same) elements.

Interface module 500 may include a controller 502 coupled to connector 146, and thus tablet computer 110, by a link (e.g., a signal link) 504. Link 504 may direct signals from a signal port of tablet computer 110 to and/or from controller 502. Link 504 may include two conductors, e.g., for carrying different signals, such as the D− and D+ signals defined for the USB protocol. The term "signals" as used herein may be used to differentiate these signals from power, current, and voltage and may at least include data signals (e.g., data) that may be directed to controller 502 from the signal port of tablet computer 110 and from controller 502 to the signal port of tablet computer 110, command signals (e.g., commands, such as read/write commands), address signals (e.g., addresses), and control signals directed to controller 502 from the signal port of tablet computer 110, and status signals directed from controller 502 to the signal port of tablet computer 110. Links, such as link 504, used to carry these signals may be referred to as signal lines. Signals herein that have functions other than those covered by the term "signals" will be specified according to their particular function.

Controller 502 may be configured to allow communication between tablet computer 110 and removable storage device 160 and/or removable storage device 162. Controller 502 may be configured to translate the signals from a format used by tablet computer 110 to a format recognized by removable storage device 160 and/or removable storage device 162. For example, controller 502 may be configured translate signals from formats used by APPLE® iPad®, BLACKBERRY® Playbook, HP (Hewlett Packard) TouchPad™, ANDROID® tablets, etc., to a format recognized by removable storage device 160 and/or removable storage device 162. For some embodiments, controller 502 may include a USB controller.

Interface module 500 may include a battery charger 510 coupled to connector 146, and thus tablet computer 110, by a link (e.g., a power link) 516. Power link 516 may direct power from a power port of tablet computer 110 to battery charger 510. The power port may include a voltage port coupled to a voltage (e.g., a bus voltage defined for the USB protocol) and a ground port. Link 516 may include conductors respectively coupled to the bus voltage port and the ground port of tablet computer 110.

Power link 516 may supply power (e.g., current) from the power port of tablet computer 110 to battery charger 510 that in turn supplies the current to a battery 512. Battery charger 510 may be configured to determine (e.g., sense) the voltage on battery 512 and to charge battery 512 in response to the voltage on battery 512 falling below a certain value. Battery charger 510 may be coupled to battery 512, e.g., by a bidirectional link 514, that may carry current between battery 512 and battery charger 510. A portion of the power from tablet computer 110 may be directed directly to controller 502 over a power link 518 that couples power link 516 to controller 502.

For some embodiments, controller 502 may be configured to negotiate with tablet computer 110 for additional power, such as when exchanging signals with the tablet computer 110, e.g., in a manner that is provided by the USB protocol. If tablet computer 110 grants the additional power, controller 502 may send a charge enable signal to battery charger 510 over a link 520 in response to tablet computer 110 granting the additional power. The battery charger 510 may allow power (e.g., current) to be received threat in response to receiving the charge enable signal. The battery charger 510 may charge battery 512 if battery charger 510 deems it necessary to charge battery 512.

Battery charger 510 may output power to controller 502 over a power link 524 that couples battery charger 510 to controller 502. This power may be regulated power that may be output using a voltage regulator of battery charger 510.

For some embodiments, a portion of controller 502 may be powered by power received over power link 518 from tablet computer 110, e.g., the portion of controller 502 that receives the signals over signal link 504. A remaining portion of controller 502 may then be powered by power received from battery charger 510 over power link 524. For example, controller 502 (e.g., while partially powered by power received over power link 518) may signal battery charger 510 to supply power over power link 524 sufficient to power the remainder of controller 502, including power supplied by controller 502 to power storage device 160 and/or storage device 162. For other embodiments, controller 502 may be fully powered by power supplied thereto over power link 518.

Controller 502 may be coupled to connector 153, and thus storage device 160, by a signal link 530 and to connector 155, and thus storage device 162, by a signal link 536. Controller 502 may receive signals (e.g., read/write commands, control signals, data, etc.) from tablet computer 110, translate the signals into a format supported by storage device 160 and/or storage device 162, and output the translated signals to storage device 160 over signal link 530 and/or to storage device 162 over signal link 536. Controller 502 may receive signals (such as data and status signals) respectively from storage device 160 and storage device 162 over signal link 530 and signal link 536, translate the signals into a format supported by tablet computer 110, and output the translated signals to tablet computer 110.

For some embodiments, controller 502 may be coupled to connector 153, and thus storage device 160, by a power link 538 and to connector 155, and thus storage device 162, by a power link 540. Controller 502 may supply at least some of the power it receives from battery charger 510 to storage device 160 and storage device 162 respectively over power link 538 and power link 540. Alternatively, for other embodiments, battery charger 510 may be coupled to directly to connector 153, and thus storage device 160, by a power link 544 and directly to connector 155, and thus storage device 162, by power link 548 (power links 544 and 548 are shown as dashed lines to denote the alternative to power links 538 and 540), so battery charger 510 may supply power directly to storage device 160 and storage device 162 respectively over power link 538 and power link 548.

For some embodiments, controller 502 may be fully powered by power supplied thereto over power link 518, and the power supplied to controller 502 from battery charger 510 over power link 524 may be used to power storage device 160 and/or storage device 162 only. For other embodiments, the portion of controller 502 that receives signals from signal link 504 may be powered by power supplied thereto over power link 518 only, while the power supplied to controller 502 from battery charger 510 over power link 524 may be used to power the remainder of controller 502 and to power storage device 160 and/or storage device 162.

Figure 6:
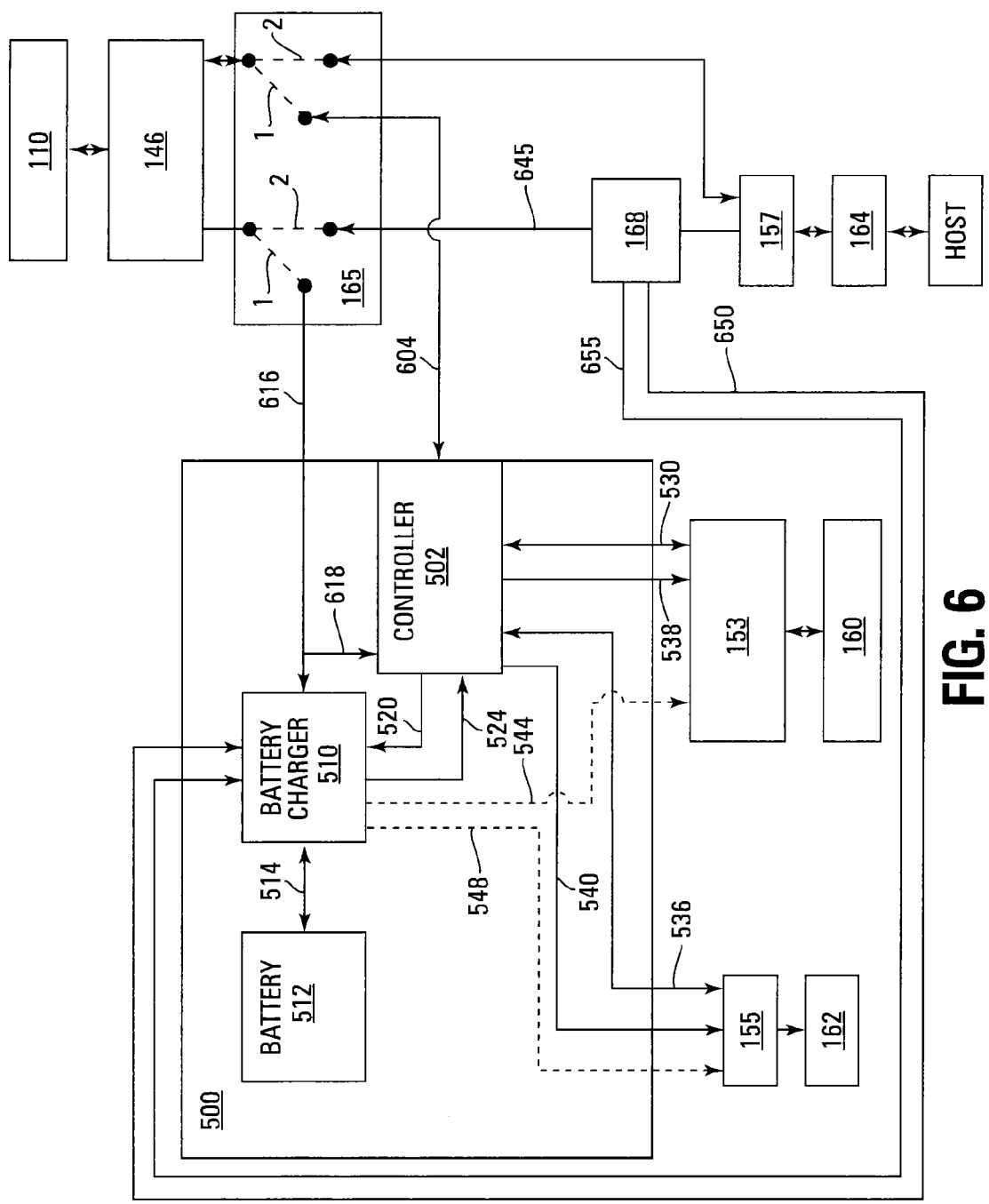
FIG. 6 is a block diagram of an interface of a case, according to another embodiment.

FIG. 6 is a block diagram of an interface, such as interface 140 for embodiments with switch 165, current sensor 168, and connector 157, as described above in conjunction with FIGS. 1C, 2D, and 4C. Common numbering is used in FIGS. 1C, 2D, 4C, and 5 and FIG. 6 to denote similar (e.g., the same) elements.

In position (state) 1, switch 165 may selectively couple connector 146, and thus the power port of tablet computer 110, to battery charger 510 via power link 616. In position 1, switch 165 may selectively couple connector 146, and thus the signal port of tablet computer 110, to controller 502 via signal link 604. In other words, when switch is in position 1, communication between tablet computer 110 and controller 502, and thus storage device 160 and/or 162, is allowed.

When switch 165 is in position 1, power (e.g., current) may be supplied to battery charger 510 from tablet computer 110 over power link 616, a portion of which may be sent to controller 502 by power link 618 that may couple power link 616 to controller 502. When switch 165 is in position 1, controller 502 may negotiate with tablet computer 110 for additional power, as described above in conjunction with FIG. 5. If tablet computer 110 grants the additional power, controller 502 may send the charge enable signal to battery charger 510 over link 520. The battery charger then charges battery 512 in response to receiving the charge enable signal.

When switch 165 is in position 1, signals (e.g., data, commands, and addresses) may be sent from connector 146, and thus tablet computer 110, to controller 502 over signal link 604, and signals (e.g., data, status signals, etc.) may be sent over signal link 604 from controller 502 to connector 146, and thus tablet computer 110. Signal link 604 may include two conductors, e.g., for carrying different signals, such as the D− and D+ signals for the USB protocol. The two conductors may be coupled to two poles of switch 165, e.g., that may be respectively coupled to D− and D+ signal ports of tablet computer 110. Link 616 may also include two conductors that may be coupled to two more poles of switch 165, e.g., where these two poles may be respectively coupled to the bus voltage and ground ports of tablet computer 110. As such, switch 165 may be a two-position, four-pole switch. In position 1, switch 165 may couple the respective ones of the two conductors of link 616 to the ground and the bus voltage ports of tablet computer 110.

In position (state) 2, switch 165 selectively couples connector 157, and thus the host, to tablet computer 110. For example, current may be sent from the host to tablet computer 110 over power link 645, e.g., through current sensor 168, for charging tablet computer 110. Signals, such as data, commands, control signals, may also be sent from the host to tablet computer 110 when switch 165 is in position 2, or signals, such as data, may be sent from tablet computer 110 to the host when switch 165 is in position 2. This may be referred to as synchronizing tablet computer 110 to the host. Note that when switch 165 is in its second position, tablet computer 110 is decoupled from the interface, and thus storage device 160 and/or storage device 162, thereby preventing communication between tablet computer 110 and controller 502 and thus storage device 160 and/or storage device 162.

When switch 165 is in position 2, current sensor 168 may sense the current being drawn by tablet computer 110. Current sensor 168 may include a comparator that may compare the sensed current to a certain value, such as 100 milliamps. Current sensor 168 may send a current enable signal to battery charger 510 over link 650 in response to the sensed current exceeding the certain value. Battery charger 510 then allows current to flow from the host to battery charger 510, and thus to battery 512 if needed, through current sensor 168 and over power link 655.

Note that when the current drawn by the tablet computer 110 is above the certain value, the host may concurrently supply current to battery charger 510 and tablet computer 110, for some embodiments. For example, tablet computer 110 and battery 512 may be charged concurrently when switch 165 is in its second position, the current is above the certain value, and battery charger 510 deems it necessary to charge battery 512. Note that a portion of the current received at current sensor 168 from the host may be sent to tablet computer 110 and another portion may be sent to battery charger 510. When the current is less than or equal to the certain value, substantially all of the current from the host may pass through the current sensor to tablet computer 110, without going to battery charger 510, for charging tablet computer 110.

In general, controller 502, and thus the interface, such as interface 140, may be configured allow removable storage device 160 and/or removable storage device 162 to communicate with tablet computer 110, so that tablet computer 110 can at least write data to and read data from removable storage device 160 and/or removable storage device 162. The interface may be configured, for some embodiments, to direct power from tablet computer 110 to battery charger 510 for charging battery 512 and for powering controller 502 and storage device 160 and/or removable storage device 162. The interface may be configured, for other embodiments, to selectively concurrently direct power from the host to battery charger 510 and tablet computer 110, e.g., for concurrently charging tablet computer 110 and battery 512. Battery 512 may be used to supply supplemental power to controller 502 and to removable storage device 160 and/or removable storage device 162.

Figure 7A:
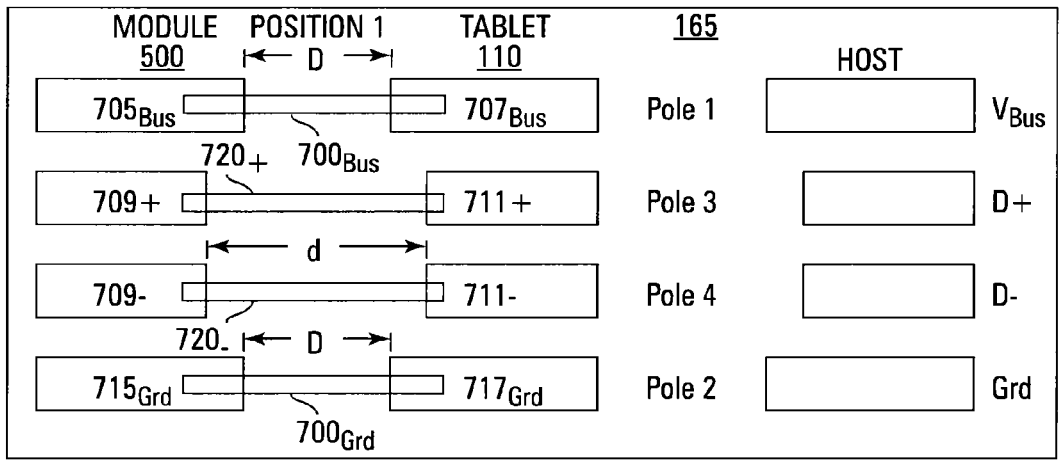
FIGS. 7A-7D show different positions of a switch during a switching sequence of the switch, according to another embodiment.
Figure 7B:
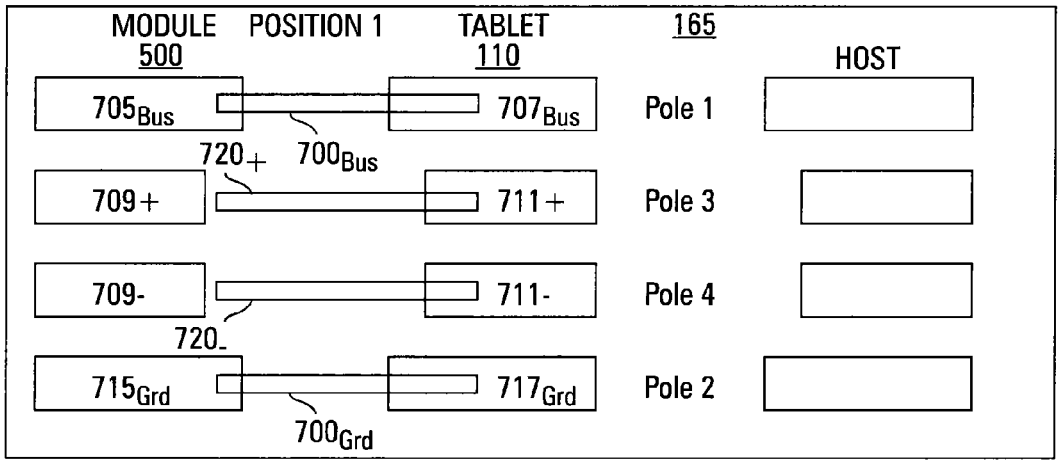
Figure 7C:
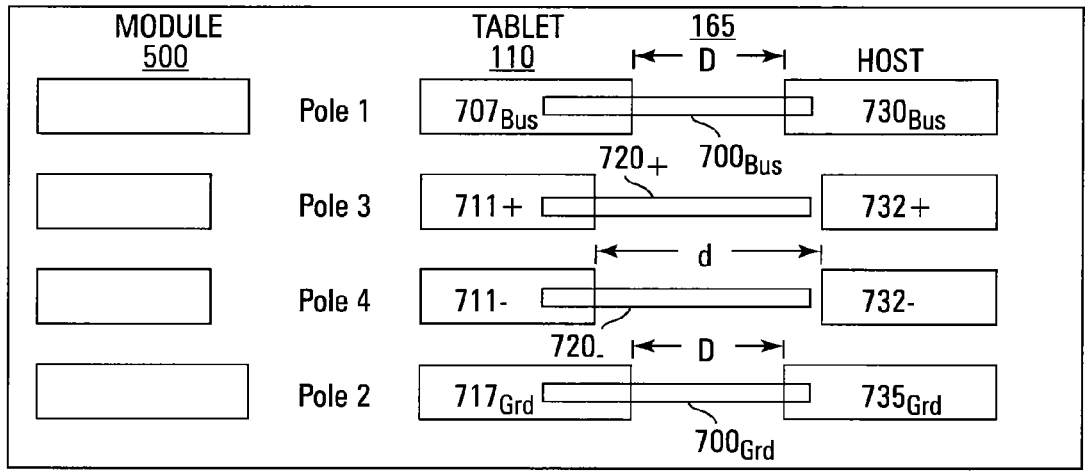
Figure 7D:
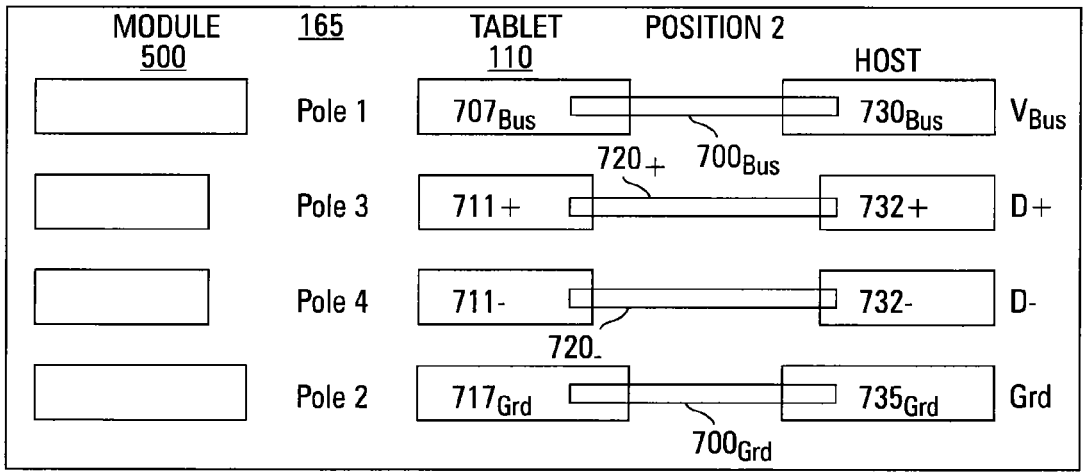

FIGS. 7A-7D illustrate an example of a switch 165, such as a two-position, four-pole switch, being switched from position 1 to position 2, e.g., by actuator 172 (FIGS. 1A, 1B, 2A, and 4B). That is, FIGS. 7A-7D show different positions of switch 165 during the switching sequence of switch 165 as it is switched from position 1 to position 2. In FIGS. 7A-7D, pole 1 and pole 2 may respectively correspond (e.g., in terms of the USB protocol) to a bus voltage $V_{Bus}$, and to ground Grd, and pole 3 and pole 4 may respectively correspond (e.g., in terms of the USB protocol) to different signals, such the D+ and D− signals of the USB protocol. FIG. 7A shows switch 165 in position 1, and FIG. 7D shows switch 165 in position 2.

In FIGS. 7A-7B, stationary conductors $705_{Bus}$ and $715_{Grd}$ may be coupled to battery charger 510 via power link 616 (FIG. 6), and stationary conductors 709+ and 709− may be coupled to controller 502 via signal link 604. Stationary conductors $707_{Bus}$ and $717_{Grd}$ may be respectively coupled to the bus voltage port and to the ground port of tablet computer 110, where the bus voltage port and the ground port may define the power port of tablet computer 110. Stationary conductors 711+ and 711− may be respectively coupled to positive and negative (e.g., D+ and D−) signal ports of tablet computer 110. The distance d between conductors 709+ and 711+ and between conductors 709− and 711− may be greater than the distance D between conductors $705_{Bus}$ and $707_{Bus}$ and between conductors $715_{Grd}$ and $717_{Grd}$.

In position 1, a conductor $700_{Bus}$ may couple conductor $705_{Bus}$ to conductor $707_{Bus}$; a conductor $720_+$ may couple conductor 709+ to conductor 711+; a conductor $720_-$ may couple conductor 709− to conductor 711−; and a conductor $700_{Grd}$ may couple conductor $715_{Grd}$ to conductor $717_{Grd}$. Conductors $700_{Bus}$, $720_+$, $720_-$, and $700_{Grd}$ may be substantially the same length and may be aligned (e.g., vertically aligned in the frame of reference of FIGS. 7A-7D). Conductors $700_{Bus}$, $720_+$, $720_-$, and $700_{Grd}$ may move concurrently as a single unit, e.g., in response to moving actuator 172, so that the vertical alignment is maintained throughout the movement, i.e., throughout the switching sequence presented in FIGS. 7A-7D.

In FIGS. 7C-7D, conductor $730_{Bus}$ and $735_{Grd}$ may be respectively coupled to a bus voltage port and to ground port of the host, where bus voltage port and ground port may define a power port of the host. Conductors 732+ and 732− may be respectively coupled to positive and negative (e.g., D+ and D−) signal ports of the host. In position 2, (FIG. 7D), conductor $700_{Bus}$ may couple conductor $707_{Bus}$ to conductor $730_{Bus}$; conductor $720_+$ may couple conductor 711+ to conductor 732+; conductor $720_-$ may couple conductor 711− to conductor 732−; and conductor $700_{Grd}$ may couple conductor $717_{Grd}$ to conductor $735_{Grd}$. In the example of FIGS. 7C-7D, the distance between conductors 711+ and 732+ and between conductors 711− and 732− may be the distance d, and the distance between conductors $707_{Bus}$ and $730_{Bus}$ and between conductors $717_{Grd}$ and $735_{Grd}$ may be the distance D, as shown in FIG. 7C.

FIG. 7B shows that after conductors $700_{Bus}$, $720_+$, $720_-$, and $700_{Grd}$ are moved as a single unit (e.g., to the right), conductors $720_+$ and $720_-$ respectively decouple from conductor 709+ and conductor 709− so that conductor 709+ is decoupled from conductor 711+ and conductor 709− is decoupled from conductor 711−, while conductor $705_{Bus}$ remains coupled to conductor $707_{Bus}$ by conductor $700_{Bus}$ and conductor $715_{Grd}$ remains coupled to conductor $717_{Grd}$ by conductor $700_{Grd}$. This is due to the fact that conductors $700_{Bus}$, $720_+$, $720_-$, and $700_{Grd}$ move as a single unit and remain vertically aligned and that the distance d is greater than the distance D. In other words, interface module 500, and thus storage device 160 and/or 162, remains coupled to the power port of the tablet computer 110 (e.g., the bus voltage port and ground port of tablet computer 110), while the D+ and D− ports of tablet computer 110 are decoupled from interface module 500, and thus storage device 160 and/or 162. If the D+ and D− ports, for example, were decoupled after the power port, controller 502 and storage device 160 and/or 162 could potentially be rendered unusable. For example, if the D+ and D− ports of tablet computer are coupled to storage device 160 and/or 162 through the interface, while the power port of tablet computer 110 is decoupled from storage device 160 and/or 162, storage device 160 and/or 162 could potentially be rendered unusable.

FIG. 7C shows that as conductors $700_{Bus}$, $720_+$, $720_-$, and $700_{Grd}$ are further moved as a single unit (e.g., further to the right), conductors $700_{Bus}$ and $700_{Grd}$ may respectively couple conductor $707_{Bus}$ to conductor $730_{Bus}$ and conductor $717_{Grd}$ to conductor $735_{Grd}$ before conductor $720_+$ couples conductor 711+ to conductor 732+ and conductor $720_-$ couples conductor 711− to conductor 732−. This is due to the fact that conductors $700_{Bus}$, $720_+$, $720_-$, and $700_{Grd}$ move as a single unit and remain vertically aligned and that the distance d is greater than the distance D. In other words, the D+ and D− ports of tablet computer 110 remain decoupled from the D+ and D− ports of the host, while the power ports (e.g., the bus voltage and ground ports) of tablet computer 110 are coupled to the power ports of the host. If the D+ and D− ports of tablet computer 110 are coupled to the D+ and D− ports of the host, while power ports of tablet computer 110 are decoupled from the power ports of the host, tablet computer and/or the host could suffer damage.

FIGS. 7D-7A show different positions of switch 165 during the switching sequence of switch 165 as it is switched from position 2 to position 1. From this perspective, FIG. 7C shows that as conductors $700_{Bus}$, $720_+$, $720_-$, and $700_{Grd}$ are moved as a single unit (e.g., to the left), conductor $720_+$ decouples conductor 711+ from conductor 732+ and conductor $720_-$ decouples conductor 711− from conductor 732− before conductors $700_{Bus}$ and $700_{Grd}$ respectively decouple conductor $707_{Bus}$ from conductor $730_{Bus}$ and conductor $717_{Grd}$ from conductor $735_{Grd}$. FIG. 7B shows that as conductors $700_{Bus}$, $720_+$, $720_-$, and $700_{Grd}$ are moved as a single unit (e.g., further to the to the left), conductors $700_{Bus}$ and $700_{Grd}$ may respectively couple conductor $707_{Bus}$ conductor $705_{Bus}$ and conductor $717_{Grd}$ to conductor $715_{Grd}$ before conductor $720_+$ couples conductor 711+ to conductor 709+ and conductor $720_-$ couples conductor 711− to conductor 709−.

Computer-readable instructions, such as software (e.g., that may be called applications), may be provided with each tablet computer case for use by the tablet computer 110. For example, the computer-readable instructions may be downloaded onto tablet computer 110, e.g., off the Internet, or provided on a non-transitory computer-usable medium from which the computer-readable instructions may be downloaded onto tablet computer 110 via the host. Examples of non-transitory media may include, e.g., static or dynamic random access memory (SRAM or DRAM), read-only memory (ROM), electrically erasable programmable ROM (EEPROM or flash memory), magnetic media, non-volatile memory cards, such as CF and SD memory cards, optical media, removable computer-usable media, such as a compact disc read-only memory (CD-ROM) or digital video disc (DVD), etc.

The computer-readable instructions may be contained on a non-transitory media, such as memory, of tablet computer 110. The computer-readable instructions may allow (e.g., cause) the tablet computer 110 to access (e.g., view) data files of storage device 160 and/or storage device 162, to move and/or copy data from storage device 160 and/or storage device 162 to the memory of tablet computer, and/or to move and/or copy data from the memory of tablet computer to storage device 160 and/or storage device 162.

For some embodiments, the computer-readable instructions may allow tablet computer 110 to send a command to storage device 160 and/or storage device 162 to reset storage device 160 and/or storage device 162 to their original condition, such as received from the factory, e.g., in the event storage device 160 and/or storage device 162 become fragmented or corrupted. The command may be a vendor-specific command that may not need to be translated by controller 502 before the command is sent to storage device 160 and/or storage device 162. As such, the command may pass through controller 502.

In response to receiving the command, storage device 160 and/or storage device 162 may erase all of their data and all entries (e.g., all of the physical addresses) in their allocation tables corresponding to logical storage locations for the erased data. For example, the command may activate a sanitize command in a CompactFlash® memory device that is supported by the CompactFlash® 6.0 protocol. The computer-readable instructions may allow tablet computer 110 to display an icon or a menu option corresponding to storage device 160 and an icon or a menu option corresponding to storage device 162 so the command may be sent in response to selecting the icon or the menu option.

The computer-readable instructions may allow tablet computer 110 to erase all entries (e.g., all of the physical addresses) from an allocation table of a storage device 160 and/or storage device 162, e.g., without erasing the data in logical storage locations addressed by those addresses, so that the data remains, but is not accessible. As such, a data erase cycles (e.g., data block erase) may be avoided. The computer-readable instructions may allow tablet computer 110 to erase only certain entries (e.g., certain physical addresses) of an allocation table, e.g., without erasing the data in logical storage locations addressed by those physical addresses, thus preventing access to the data stored in those logical storage locations, according to a release instruction from tablet computer 110 that informs storage device 160 and/or storage device 162 that is okay to release data from those logical storage locations. For example, tablet computer may send an instruction to storage device 160 and/or storage device 162 through controller 502, indicating that data from logical storage locations have been released and that it is okay to reuse those logical storage locations for other data.

Although specific embodiments have been illustrated and described herein, it will be appreciated by those of ordinary skill in the art that any arrangement that is calculated to achieve the same purpose may be substituted for the specific embodiments shown. Many adaptations of the embodiments will be apparent to those of ordinary skill in the art. Accordingly, this application is intended to cover any adaptations or variations of the embodiments.

What is claimed is:

1. A case for a tablet computer, comprising:
a base;
a cover pivotally attached to the base;
an interface comprising controller coupleable to a removable storage device that is configured to allow the tablet computer to communicate with the removable storage device using a communication protocol not supported by the tablet computer, the interface further comprising a current sensor coupled to a first connector that is coupleable to a host, a battery charger, and a switch that in a first position selectively couples the controller and the battery charger to a second connector that is coupleable to the tablet computer and that in a second position couples the current sensor and the first connector to the second connector;
wherein the cover is configured to store one or more spare storage devices while the one or more spare storage devices are not coupled for communication with the interface;
wherein the current sensor is configured to receive current from the host and to send substantially all of the current received from the host to the tablet computer in response to determining that the current received from the host is less than or equal to a certain value when the switch is in the second position and to concurrently send a first portion of the current received from the host to the tablet computer and a second portion of the current received from the host to the battery charger in response to determining that the current received from the host is greater than the certain value when the switch is in the second position;
wherein when the switch is in the first position, the battery charger is coupled to receive current from the tablet computer.

2. The case of claim 1, wherein the case comprises a folder.

3. The case of claim 1, wherein the case comprises a frame.

4. The case of claim 1, wherein the controller is configured to translate signals from the tablet computer and to send the translated signals to the removable storage device, and configured to translate signals from the removable storage device and to send the translated signals to the tablet computer.

5. The case of claim 1, wherein the current sensor being configured to send substantially all of the current received from the host to the tablet computer comprises current sensor being configured to send none of the current received from the host to the battery charger.

6. The case of claim 1, wherein the battery charger is configured to accept the second portion current from the current sensor in response to receiving an enable signal from the current sensor in response to the sensor determining that the current received from the host is greater than the certain value.

7. The case of claim 1, wherein the switch is a two-position, four pole switch.

8. The case of claim 1, wherein the removable storage device is a first removable storage device having a first communication protocol, and wherein the interface is configured to allow the tablet computer to communicate with a second removable storage device using a second communication protocol not supported by the tablet computer.

9. The case of claim 8, wherein the first and second removable storage devices at least have different form factors.

10. The case of claim 1, wherein the cover being configured to store the one or more spare storage devices comprises the cover comprising a surface comprising one or more recesses for storing the one or more storage devices therein.

11. The case of claim 10, wherein the one or more recesses each comprise a first portion for storing a respective spare storage device of one or more storage devices therein and a second portion contiguous to the first portion that is uncovered by the respective spare storage device when the respective spare storage device is stored in the first portion and that provides access to a user's finger to facilitate the removal of the spare storage device from the first portion.

12. The case of claim 10, wherein the cover comprises a resilient material configured to exert a retaining force on the one or more spare storage devices when the one or more spare storage devices are stored in the one or more recesses.

13. The case of claim 10, wherein the surface faces and covers the tablet computer when the case is closed.

14. The case of claim 1, further comprising a housing on the base and that contains the interface.

15. The case of claim 14, wherein the housing includes a portion configured to wrap around at least a portion of the tablet computer.

16. The case of claim 14, wherein the housing comprises an opening configured to receive the removable storage device.

17. The case of claim 1, wherein the cover contains at least a portion of the interface and the base is configured to contain at least a portion of the tablet computer therein.

18. The case of claim 17, wherein the base contains at least another portion of the interface that is communicatively coupled to the portion of the interface in the cover by a flexible link.

19. The case of claim 17, wherein there is an opening in the cover that provides access to the interface for the removable storage device and that is configured to receive the removable storage device therein.

20. The case of claim 1, wherein the tablet computer contains computer-useable instructions that allow the tablet computer to send a command to the removable storage device to erase all data from the removable storage device.

21. The case of claim 1, wherein the tablet computer contains computer-useable instructions that allow the tablet computer to erase all entries from an allocation table of the removable storage device.

22. The case of claim 1, wherein the tablet computer contains computer-useable instructions that allow the tablet computer to erase certain entries from an allocation table of the removable storage device, wherein the certain entries are erased based on a release instruction from the tablet computer.

23. The case of claim 1, wherein the tablet computer contains computer-useable instructions that allow the tablet computer to access data files of the removable storage device, move and/or copy data from the storage device to memory of the tablet computer, and/or move and/or copy data from the memory of tablet computer to the removable storage device.

24. A case for a tablet computer, comprising:
a controller coupleable to a storage device and configured to allow the tablet computer to communicate with the storage device using a communication protocol not supported by the tablet computer;
a battery charger;
a current sensor coupled to a first connector that is coupleable to a host; and
a switch that in a first position selectively couples the controller and the battery charger to a second connector that is coupleable to the tablet computer and that in a second position couples the current sensor and the first connector to the second connector;
a support directly pivotally attached to a pad rotatably attached the case so that the support rotates with the pad, wherein the support is for supporting the case at a plurality of different angles from the vertical;
wherein the case is configured to contain at least a portion of the tablet computer therein;
wherein the current sensor is configured to receive current from the host and to send substantially all of the current received from the host to the tablet computer in response to determining that the current received from the host is less than or equal to a certain value when the switch is in the second position and to concurrently send a first portion of the current received from the host to the tablet computer and a second portion of the current received from the host to the battery charger in response to determining that the current received from the host is greater than the certain value when the switch is in the second position; and
wherein when the switch is in the first position, the battery charger is coupled to receive current from the tablet computer.

25. The case of claim 24, wherein the pad rotates about an axis that is substantially perpendicular to an axis about which the support pivots.

26. A case for a tablet computer, comprising:
a controller coupleable to the tablet computer and a storage device and configured to allow the tablet computer to communicate with the storage device;
a battery charger;
a current sensor coupled to a first connector that is coupleable to a host; and
a switch that in a first position selectively couples the controller and the battery charger to a second connector that is coupleable to the tablet computer and that in a second position couples the current sensor and the first connector to the second connector;
wherein the battery charger is configured to supply power to the storage device;
wherein the current sensor is configured to receive current from the host and to send substantially all of the current received from the host to the tablet computer in response to determining that the current received from the host is less than or equal to a certain value when the switch is in the second position and to concurrently send a first portion of the current received from the host to the tablet computer and a second portion of the current received from the host to the battery charger in response to determining that the current received from the host is greater than the certain value when the switch is in the second position; and
wherein when the switch is in the first position, the battery charger is coupled to receive current from the tablet computer.

27. The case of claim 26, further comprising a battery coupled to the battery charger.

28. The case of claim 26, wherein the controller is configured so that a portion of controller is powered by power received directly from the tablet computer when the switch is in the first position.

29. The case of claim 28, wherein the controller is further configured to receive power from the battery charger, wherein the battery charger being configured to supply power to the storage device comprises the controller being configured to provide at least a portion of the power from the battery charger to the storage device.

30. The case of claim 26, wherein the controller is configured to negotiate with the tablet computer for the battery charger to receive the current from the tablet computer when the switch is in the first position, wherein the controller is configured to send an enable signal to the battery charger in response to the tablet computer granting the current from the tablet computer to the battery charger, wherein the battery charger is configured to receive the current from the tablet computer in response to receiving the enable signal.

31. The case of claim 26, wherein the battery charger is coupled to the controller for supplying power to the controller, and wherein the battery charger being configured to supply power to the storage device comprises the controller being configured to supply power from the battery charger to the storage device.

32. The case of claim 26, wherein the battery charger being configured to supply power to the storage device comprises the battery charger being coupled directly to the storage device for supplying power directly to the storage device.

33. A case for a tablet computer, comprising:
a controller coupleable to a storage device and configured to allow the tablet computer to communicate with the storage device;
a battery charger;
a current sensor coupled to a first connector that is coupleable to a host; and
a switch that in a first position selectively couples the controller and the battery charger to a second connector that is coupleable to the tablet computer and that in a second position couples the current sensor and the first connector to the second connector;
wherein the current sensor is configured to receive current from the host and to send substantially all of the current received from the host to the tablet computer in response to determining that the current received from the host is less than or equal to a certain value when the switch is in the second position and to concurrently send a first portion of the current received from the host to the tablet computer and a second portion of the current received from the host to the battery charger in response to determining that the current received from the host is greater than the certain value when the switch is in the second position;
wherein when the switch is in the first position, the battery charger is coupled to receive current from the tablet computer.

34. The case of claim 33, further comprising a battery coupled to the battery charger.

35. The case of claim 33, wherein the current sensor is coupled to the battery charger for sending an enable signal to the battery charger in response to determining that the current received from the host is greater than the certain value and for sending the second portion of the current received from the host to the battery charger after the battery charger receives the enable signal.

36. The case of claim 33, wherein the switch is configured so that the switch disconnects at least data signals from the controller before disconnecting power from the battery charger and so that the switch connects power to the battery charger before at least connecting data signals to the controller.

37. The case of claim 33, further comprising an opening at an end of the case configured to receive the storage device therein and opening at an opposite end of the case configured to provide access to the first connector and receive a connector for coupling the first connector to the host.

38. A method of operating an interface of a case for a tablet computer, comprising:
receiving a signal at a controller of the interface from the tablet computer;
translating the signal at the controller;
outputting the translated signal from the controller to a storage device coupled to the interface;
receiving current at a battery charger of the interface from the tablet computer through a switch of the interface when the switch is in a first position that couples the controller and the battery charger to the tablet computer;
sending power from the battery charger to the storage device;
receiving current from a host at a sensor of the interface coupled to the host;
in response to the sensor determining that the current received from the host at the sensor is less than or equal to a certain value, sending from the sensor substantially all of the current received from the host at the sensor to the tablet computer through the switch when the switch is in a second position that couples the sensor and the host to the tablet computer; and
in response to the sensor determining that the current received from the host at the sensor is greater than the certain value, concurrently sending from the sensor a first portion of the current received from the host at the sensor to the tablet computer through the switch when the switch is in the second position and a second portion of the current received from the host at the sensor to the battery charger when the switch is in the second position.

39. The method of claim 38, further comprising:
receiving an other signal at the controller from the storage device;
translating the other signal at the controller; and
outputting the translated other signal from the controller to the tablet computer.

40. The method of claim 38, further comprising while receiving the current at the battery charger from the tablet computer through the switch when the switch is in a first position, receiving the current at the controller from the tablet computer through the switch when the switch is in a first position.

41. The method of claim 38, further comprising using the battery charger to charge a battery of the interface in response to a voltage of the battery falling below a certain value.

42. The method of claim 38, wherein receiving the current at the battery charger from the tablet computer through the switch when the switch is in the first position is in response to the tablet computer and the controller negotiating for the battery charger to receive current from the tablet computer through the switch when the switch is in the first position and the controller sending an enable signal to the battery charger in response to the tablet computer granting the battery charger to receive current from the tablet computer through the switch when the switch is in the first position.

43. A method of operating an interface of a case for a tablet computer, comprising:
directing current from the tablet computer to a battery charger of the interface through a switch of the interface when the switch of the interface is in a first position that couples a controller of the interface and the battery charger to the tablet computer;
receiving current from a host at a sensor of the interface coupled to the host;
in response to the sensor determining that the current received from the host at the sensor is less than or equal to a certain value, directing from the sensor substantially all current received from the host at the sensor to the tablet computer through the switch when the switch is in a second position that couples the sensor and the host to the tablet computer; and
in response to the sensor determining that the current received from the host at the sensor is greater than the certain value, concurrently directing from the sensor a first portion of the current received from the host at the sensor to the tablet computer through the switch when the switch is in the second position and a second portion of the current received from the host at the sensor to the battery charger when the switch is in the second position.

44. The method of claim 43, wherein directing the current from the tablet computer to the battery charger through the switch when the switch is in the first position results from the tablet computer granting the battery charger to receive the current from the tablet computer through the switch when the switch is in the first position as a result of a negotiation between the tablet computer and the controller.

45. The method of claim 43, further comprising:
allowing communication between the tablet computer and the controller of the interface when the switch is in the first position; and
preventing communication between the tablet computer and the controller of the interface when the switch is in the second position.

* * * * *